Sept. 3, 1929.   L. BLUMENTHAL   1,727,157
AEROPLANE SAFETY DEVICE
Filed Aug. 22, 1927   2 Sheets-Sheet 1
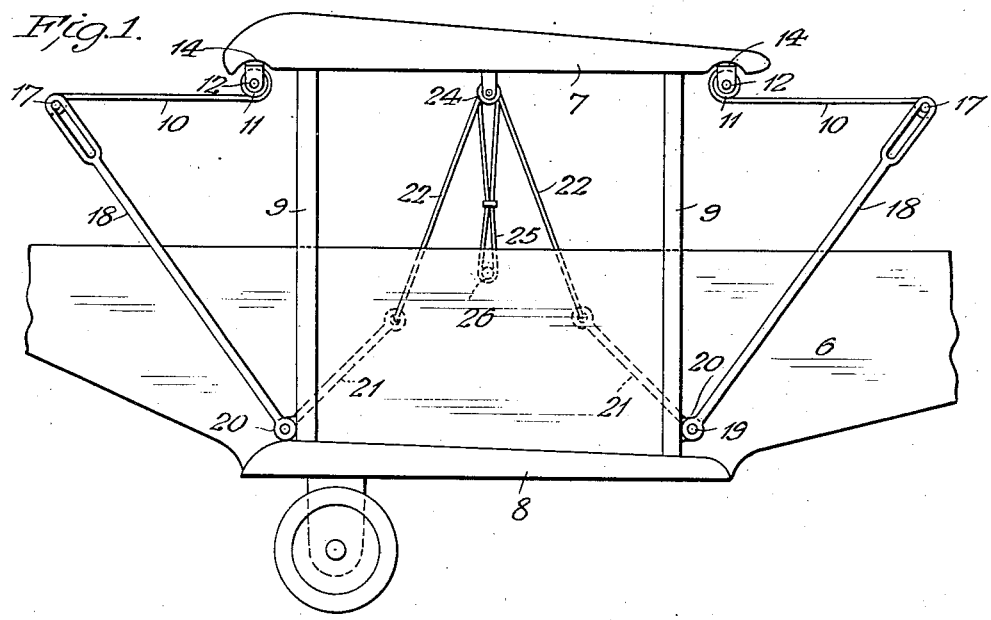
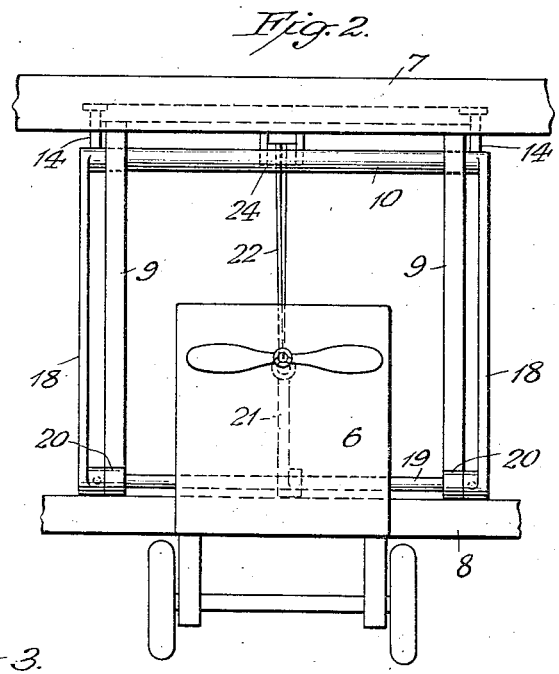
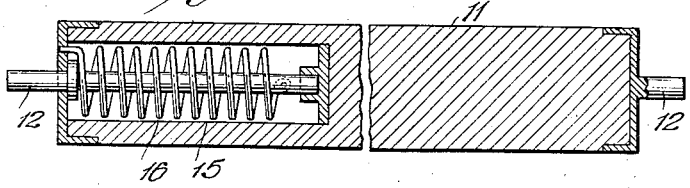
INVENTOR
LOUIS BLUMENTHAL
BY
ATTORNEYS Sept. 3, 1929.   L. BLUMENTHAL   1,727,157
AEROPLANE SAFETY DEVICE
Filed Aug. 22, 1927   2 Sheets-Sheet 2
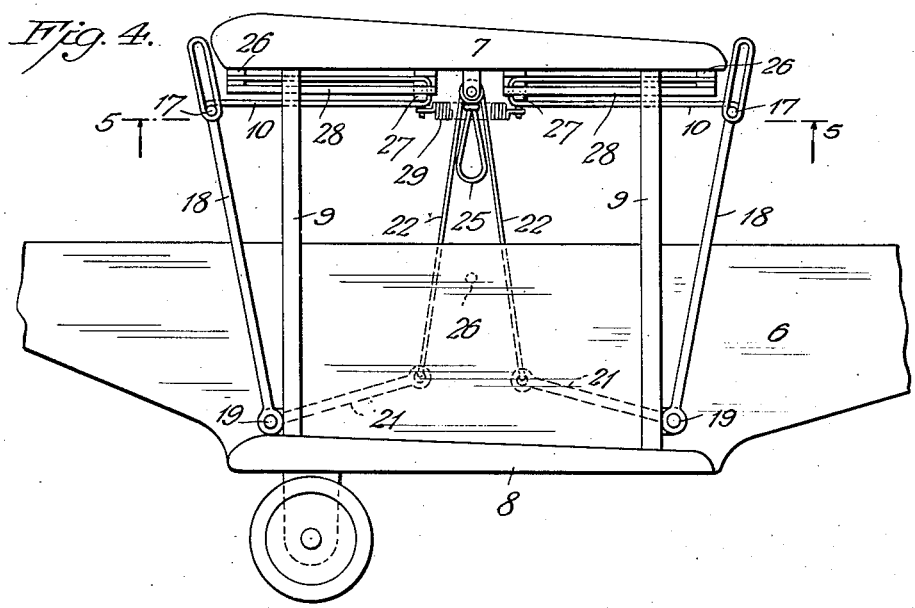
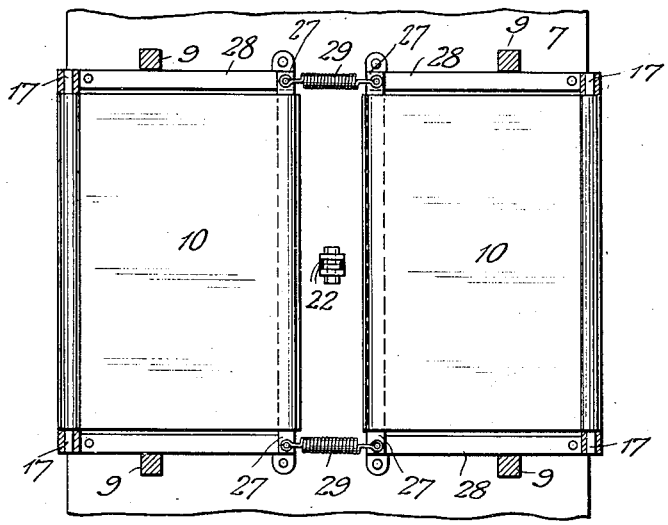
INVENTOR
Louis Blumenthal.
BY
ATTORNEYS Patented Sept. 3, 1929.

1,727,157

UNITED STATES PATENT OFFICE.

LOUIS BLUMENTHAL, OF BROOKLYN, NEW YORK.

AEROPLANE SAFETY DEVICE.

Application filed August 22, 1927. Serial No. 214,598.

This invention relates to a safety device for aeroplanes which is brought into action by the operator when it is desired to descend and it includes auxiliary wings extending from the upper wings whereby the shock of landing is neutralized by the increased wing area coacting with the pressure of the air under the wings.

An object of the invention is to provide a pair of auxiliary wings made of tenacious fabric which when retracted or out of action are practically housed or concealed under the upper wings either by automatically winding them on spring rollers or sliding them in a rectilinear path to fold under the wings.

Another object of the invention is to provide means for preventing upward throw of the auxiliary wings when they are in action and a rock lever connected to the means whereby both the wings are simultaneously actuated to move them out of action.

Another object of the invention is to provide flexible means within reach of the operator for preventing the auxiliary wings when in their extended position from moving backward by the action of a spring connected to the retracting devices of the auxiliary wings.

The invention resides more particularly in the novel combinations hereinafter described and claimed, reference being made to the accompanying drawings in which:

Fig. 1 represents a side elevation of an aeroplane embodying this invention.

Fig. 2 is a front view of the same.

Fig. 3 is a longitudinal section of a spring roller on a larger scale.

Fig. 4 is a view similar to Fig. 1 showing the method of folding the auxiliary wings.

Fig. 5 is a horizontal section taken along the line 5—5 of Fig. 4.

In the drawings the numeral 6 designates a fuselage having upper wings 7 and lower wings 8 connected together by means of vertical struts 9 as is well known. The invention is shown applied to a byplane but it will be seen that it could be connected to any type of winged plane. The safety device for checking the shock of landing the aeroplane comprehends a pair of auxiliary wings 10 which when in action extend beyond the forward and rear portions of the upper wings as indicated in Fig. 1. The wings are preferably made of tough canvas or other suitable material to withstand the air pressure and they are flexible to permit them to be wound or folded when out of action. Both wings are alike and each is wound on a roller 11 provided with gudgeons 12 for engagement with brackets 14 secured to the under side of the upper wings. One of the gudgeons is angular and forms a rod extending into a socket 15 located in one end of the roller as indicated in Fig. 3. A coiled spring 16 is mounted on the rod so that it will wind when the wing is moved outward and unwind to pull it back.

The forward end of the auxiliary wing is fixed to a bar 17 projecting beyond each side of the wing and slotted link members 18 coact with the ends of the bar. The lower end of each link is keyed to a rock shaft 19 which is mounted in bearings 20 secured to the struts and a lever 21 is adapted to actuate the rock shaft. There are two links fulcrumed to each of the rock shafts but a single lever 21 connects each shaft with a pair of the links and when the wing is extended the links form braces to hold the wing in a fixed immovable position. Each lever 21 has a flexible connection such as a rope 22 guided over a pulley 24 rotatively mounted on the under surface of the upper wing. Both ropes are coupled together below the pulley and a hand grip 25 is arranged below the coupling.

In order to prevent back throw of the wing when extended the hand grip of the rope is hooked to a nail or other device 26 within the reach of the operator. It will readily be understood that when the rope is unhooked the coiled spring 16 will rotate the roller 11 thus winding the canvas wing thereon and the links move with the bar toward the edge of the upper wing. When it is desired to unwind both the canvas wings the rope is pulled so as to actuate both levers and the four links at the same time while the unwinding of the canvas rotates each roller 11 to wind its respective coiled spring.

As indicated in Figs. 4 and 5 the links, levers and rope connections are similar to those shown in Figs. 1 and 2, but instead of winding the canvas on a spring roller it is folded to conceal it under the wing. This is accomplished by having one end 26 of each canvas wing secured to the under surface of the upper wing. The canvas is looped about a slide 27 and the other end is fastened to the bar 17 made to coact with the slotted links as stated above. The slide is guided on tracks 28 secured under the wing and coiled springs 29 restore the slides to the positions shown in Fig. 4 to fold the canvas wings. In order to extend the canvas the bars are moved outward away from the end of the wings and the slides move therewith thereby unfolding the canvas. Modification of the invention can be made within the law of equivalents and scope of the claims for example, the device can be provided with a sheet metal inclosure made to cover the canvas wings when rolled up or folded.

It will be understood, that the heavier the weight the bigger the surface the wings or plane have to be in order to provide enough resistance to the pressure of the air. For example as the case is now, when the operator intends to come down to the earth he has to slacken the speed in order to stop or land at a desirable place, he has to slacken down more and more until the propeller is actually at a standstill. This consequently makes the plane a dead weight compelling it to come down rapidly whereas, by building a plane with the auxiliary wings makes the plane safer and easier to land, for it is evident that when the operator finds it necessary to slacken off the power a few moments before landing all he has to do is to pull the auxiliary wing extensions out from both sides thus adding a surface about as wide and as long as the plane itself which at the time being supported by the air pressure below the wings is just sufficient to make the plane glide down very slow and safe. In other words, the extensions act the same as a parachute but with a much greater advantage for in case of an accident the operator can readily actuate the auxiliary wings to check the gravity of the plane.

I claim:

1. In a safety device for aeroplanes the combination with a wing, of a pair of spring rollers mounted under the wing, a flexible canvas auxiliary wing normally wound on each roller, a pair of links connected to each of the auxiliary wings, and each pair having a rock lever, and means for operating the rock levers to simultaneously pull both auxiliary wings beyond the ends of the wing.

2. In a safety device for aeroplanes the combination with a wing, of a pair of spring rollers mounted under the wing, a flexible canvas auxiliary wing normally wound on each roller, a pair of links connected to each of the auxiliary wings, and each pair having a rock lever, and flexible means connected to the rock levers within reach of the operator to simultaneously pull both of the auxiliary wings beyond the ends of the wing.

3. In a safety landing device for aeroplanes the combination with a wing, of a pair of spring rollers mounted under the wing, a flexible canvas auxiliary wing normally wound on each roller, a pair of links connected to each of the auxiliary wings, and each pair having a rock lever, a rope connected to the rock levers within reach of the operator to simultaneously pull both of the wings beyond the ends of the wing, and means for fastening the rope to prevent backward movement of the auxiliary wings when extended.

In testimony whereof I have hereunto set my hand.

LOUIS BLUMENTHAL.